No. 764,485. PATENTED JULY 5, 1904.
W. S. MOODY.
TRANSFORMER.
APPLICATION FILED DEC. 14, 1903.
NO MODEL.

Witnesses:
George H. Tilden
Helen Orford

Inventor:
Walter S. Moody.
by Albert S. ___
Att'y.

No. 764,485. Patented July 5, 1904.

UNITED STATES PATENT OFFICE.

WALTER S. MOODY, OF SCHENECTADY, NEW YORK, ASSIGNOR TO GENERAL ELECTRIC COMPANY, A CORPORATION OF NEW YORK.

TRANSFORMER.

SPECIFICATION forming part of Letters Patent No. 764,485, dated July 5, 1904.

Application filed December 14, 1903. Serial No. 185,008. (No model.)

*To all whom it may concern:*

Be it known that I, WALTER S. MOODY, a citizen of the United States, residing at Schenectady, in the county of Schenectady and State of New York, have invented certain new and useful Improvements in Transformers, of which the following is a specification.

In designing long electric transmission systems it is now a common practice to provide transformers arranged so as to utilize when they are first installed as high a voltage as it is then thought safe to use, but not so high as may ultimately be found practicable. To accommodate this practice, transformers are now built adapted for a maximum voltage of sixty thousand volts, but arranged with taps, so that they may be used for forty thousand or fifty thousand volts. When operating at the reduced voltage, there is a considerable portion of the high-voltage winding idle. Those coils of the low-voltage winding which are adjacent to the idle coils of the high-voltage winding, due to the increased distance between them and the active portion of the high-voltage winding, set up quite a higher active flux about them. The reactance thus developed may be sufficient to increase the total reactance of the transformer by twenty-five per cent. or more, and is thus highly objectionable if good regulation be one of the objects sought for in the design of the transformer. If, however, the low-voltage coils are each wound for the full voltage and are connected in multiple, this increase of reactance will not occur, since those coils adjacent the idle high-voltage coils will then only take a small current instead of being traversed by the total current, as would be the case were they all in series. That portion of the total current which the idle low-voltage coils would take were all the high-voltage coils in use is under these circumstances deflected to low-voltage coils near the active high-voltage coils.

The novel features characteristic of the invention described briefly above are set forth with particularity in the appended claims. The invention itself, however, may perhaps be better understood by reference to the accompanying drawings, in which—

Figure 1:
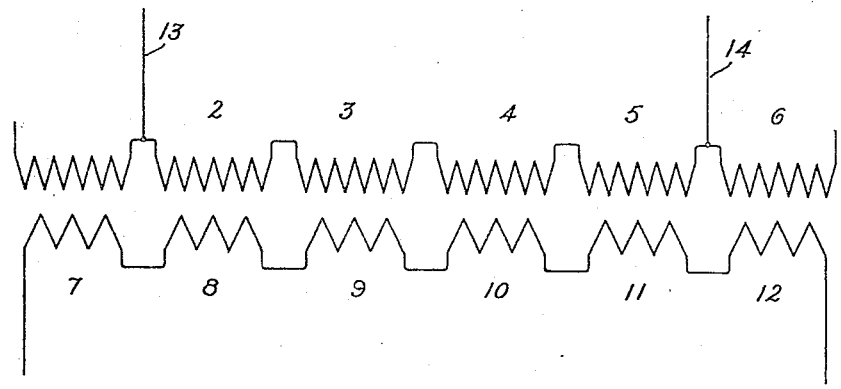
Figure 2:
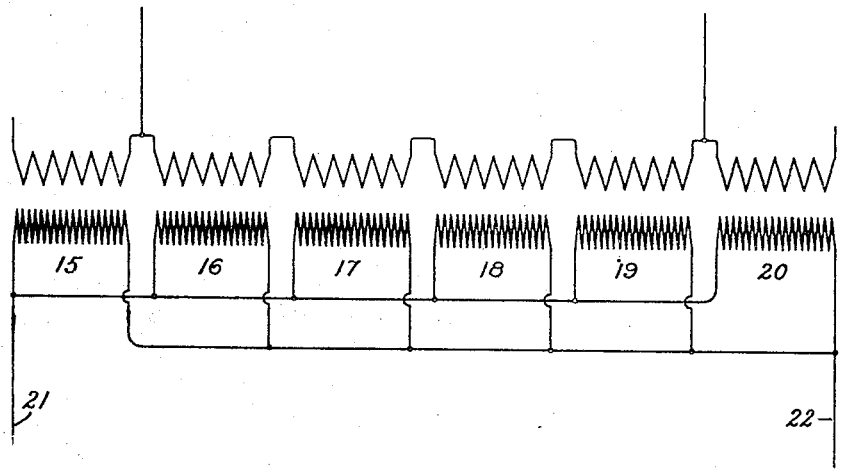

Figure 1 is a diagram of the old method of connecting the subdivided windings of a transformer, and Fig. 2 is a diagram representing my improved method of arranging windings of the transformer.

In Fig. 1 the high-voltage winding of the transformer consists of any desired number of coils or sections, such as at 1 to 6, inclusive. These coils are all connected in series. The low-voltage winding consists, similarly, of any suitable number of coils 7 to 12, inclusive, connected in series with each other. Where the maximum voltage is for any reason not used on the high-voltage winding, a corresponding amount of the winding is left out of circuit in order to raise the ratio of transformation of the transformer, and thus preserve the same voltage upon the low-voltage winding as would be given by the winding if the full voltage were used with the total high-voltage winding. With lower than the full voltage some of the high-voltage coils are left out of circuit—as, for example, the coils 1 and 6—in which case the leads 13 and 14 are connected to the outside terminals of the coils 2 and 5. With this arrangement it is evident that the low-voltage coils 7 and 12, opposite the idle high-voltage coils 1 and 6, carry the full low-voltage current and being more distant from the active high-voltage coils than are the other coils 8 to 11, inclusive, set up a higher reactive or leakage flux. The additional reactance which is thus produced when part of the high-voltage coils are unused is thus decidedly objectionable. To overcome this objection, the low-voltage winding may consist of a number of coils or sections, as 15 to 20, inclusive, Fig. 2, each wound for the full value of the voltage of the low-voltage side of the transformer. These coils are all connected in multiple with each other, as indicated, and transmit current through the mains 21 and 22. As before, the high-voltage winding of the transformer is the same as that shown in Fig. 1. When now the transformer shown in Fig. 2 is in operation, the low-voltage coils 16 to 19, inclusive, carry most of the current. The outside coils 15 and 20, because of their higher reactance, carry much less than their proper share of the load. This, however, is not objectionable.

In the foregoing description it is to be understood that the transformer, so far as my invention is concerned, may be operated with either winding as a primary and the other as a secondary. Furthermore, it is to be understood that the coils or sections 15 to 20 may themselves be subdivided. Thus the coil or section 15 may consist of individual coils interconnected with each other in series or multiple or in any other desired manner. When, therefore, I speak of "coils," I mean either a single winding or a combination of windings.

What I claim as new, and desire to secure by Letters Patent of the United States, is—

1. In a transformer, the combination of two inductively-related windings each made up of a plurality of coils, the coils of one winding being connected in series with each other and the coils of the other winding in multiple with each other, and connections for utilizing less than the whole number of the series-connected coils.

2. The combination of a transformer having one of its windings arranged so that a portion or portions thereof may be left out of circuit, and an inductively-related winding having all of its coils or sections connected in multiple with each other.

In witness whereof I have hereunto set my hand this 12th day of December, 1903.

WALTER S. MOODY.

Witnesses:
BENJAMIN B. HULL,
HELEN ORFORD.